(12) United States Patent
Klembara et al.

(10) Patent No.: US 12,510,110 B2
(45) Date of Patent: Dec. 30, 2025

(54) LOCKING ELEMENT FOR RELEASABLY LOCKING A ROTATIONAL MOVEMENT OF AN ADAPTER RELATIVE TO A BODY OF A PUSH-PULL ROD, AND PUSH-PULL ROD COMPRISING SUCH A LOCKING ELEMENT

(71) Applicant: FACC AG, Ried im Innkreis (AT)

(72) Inventors: Lukas Klembara, Bratislava (SK); Bernhard Kammerer, Zell an der Pram (AT)

(73) Assignee: FACC AG, Ried im Innkreis (AT)

( * ) Notice: Subject to any disclaimer, the term of this patent is extended or adjusted under 35 U.S.C. 154(b) by 727 days.

(21) Appl. No.: 17/754,640

(22) PCT Filed: Oct. 7, 2020

(86) PCT No.: PCT/AT2020/060356
§ 371 (c)(1),
(2) Date: Apr. 7, 2022

(87) PCT Pub. No.: WO2021/068016
PCT Pub. Date: Apr. 15, 2021

(65) Prior Publication Data
US 2023/0184278 A1 Jun. 15, 2023

(30) Foreign Application Priority Data
Oct. 7, 2019 (AT) .................... 50176/2019

(51) Int. Cl.
*F16C 7/06* (2006.01)
*F16B 7/14* (2006.01)
*F16B 2/24* (2006.01)

(52) U.S. Cl.
CPC ............... *F16B 7/14* (2013.01); *F16C 7/06* (2013.01); *F16B 2/245* (2013.01); *F16C 2226/74* (2013.01)

(58) Field of Classification Search
CPC ......... Y10T 403/32221; Y10T 403/295; F16B 7/06; F16B 7/14; F16B 7/182; F16B 2200/73; F16B 2/245; F16C 7/06
See application file for complete search history.

(56) References Cited

U.S. PATENT DOCUMENTS 1,411,279 A 4/1922 Jaynes
2,479,172 A * 8/1949 Landon ................... F16G 11/12
403/46

(Continued)

FOREIGN PATENT DOCUMENTS

CN 1514894 A 7/2004
CN 101044331 A 9/2007

(Continued)

OTHER PUBLICATIONS

China National Intellectual Property Administration, Office Action and Search Report Issued in Application No. 202080061689.2, Apr. 11, 2023, 14 pages.

(Continued)

*Primary Examiner* — Michael P Ferguson
(74) *Attorney, Agent, or Firm* — McCoy Russell LLP

(57) ABSTRACT

The disclosure relates to: a locking binding element for releasably locking an adapter relative to a body of a pushpull rod, said element comprising a lever arm and a pin connected to the lever arm, a snap-action element, and a latching device; and a push-pull rod comprising such a locking device. According to the disclosure, the snap-action element is rotatably connected to the lever arm. This allows a more flexible use of the locking element on the push-pull rod.

16 Claims, 22 Drawing Sheets

(56) References Cited

U.S. PATENT DOCUMENTS

| | | | |
|---|---|---|---|
| 2,845,288 A | 7/1958 | Cierpik, Jr. | |
| 8,371,767 B2 * | 2/2013 | Uhl | F16B 7/182 |
| | | | 403/46 |
| 9,970,466 B1 * | 5/2018 | Randolph | F16B 7/06 |
| 10,030,692 B2 * | 7/2018 | Uhl | F16C 7/06 |
| D865,490 S * | 11/2019 | Randolph | D8/382 |
| 2008/0115622 A1 | 5/2008 | Uhl et al. | |
| 2012/0224913 A1 | 9/2012 | Haller | |
| 2012/0236543 A1 * | 9/2012 | Torgerson | A42B 1/244 |
| | | | 362/106 |
| 2013/0319172 A1 | 12/2013 | Uhl | |

FOREIGN PATENT DOCUMENTS

| | | | |
|---|---|---|---|
| CN | 103552576 A | 2/2014 | |
| DE | 202004004407 | 7/2004 | |
| DE | 202004016321 U1 | 3/2005 | |
| DE | 202011002079 U1 | 5/2011 | |
| DE | 20 2012 103 224 * | 11/2012 | F16B 7/04 |
| WO | 2011057627 A1 | 5/2011 | |

OTHER PUBLICATIONS

ISA European Patent Office, International Search Report Issued in Application No. PCT/AT2020/060356, Jan. 21, 2021, WIPO, 51 pages.

* cited by examiner

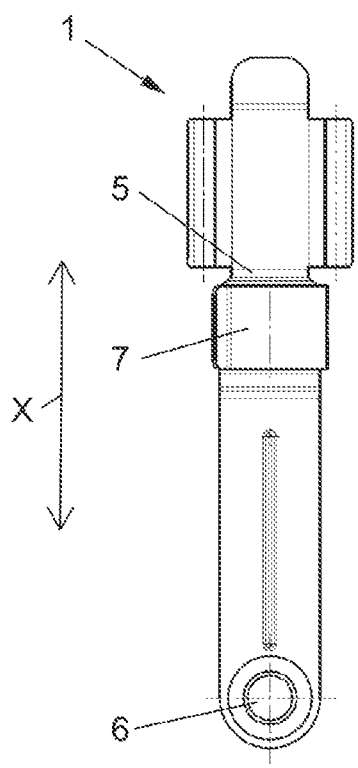
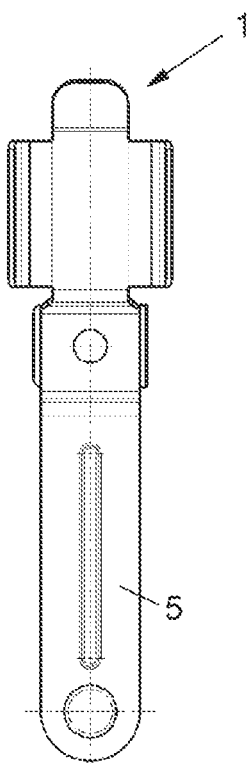
Fig. 3a    Fig. 3b
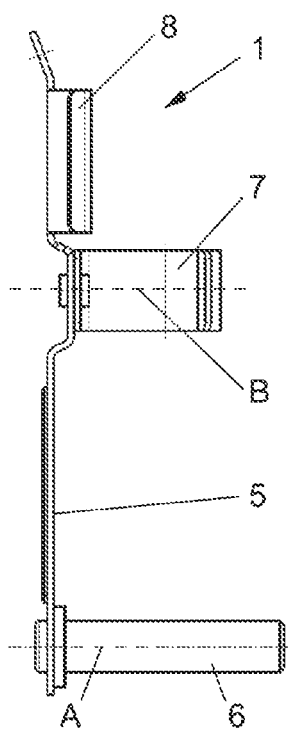
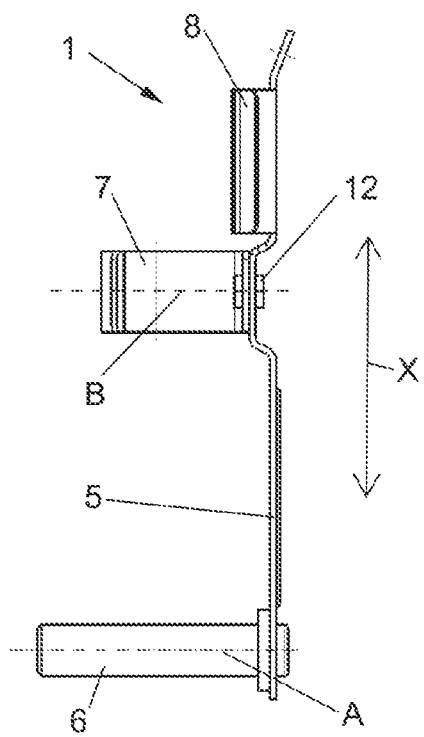
Fig. 3c    Fig. 3d

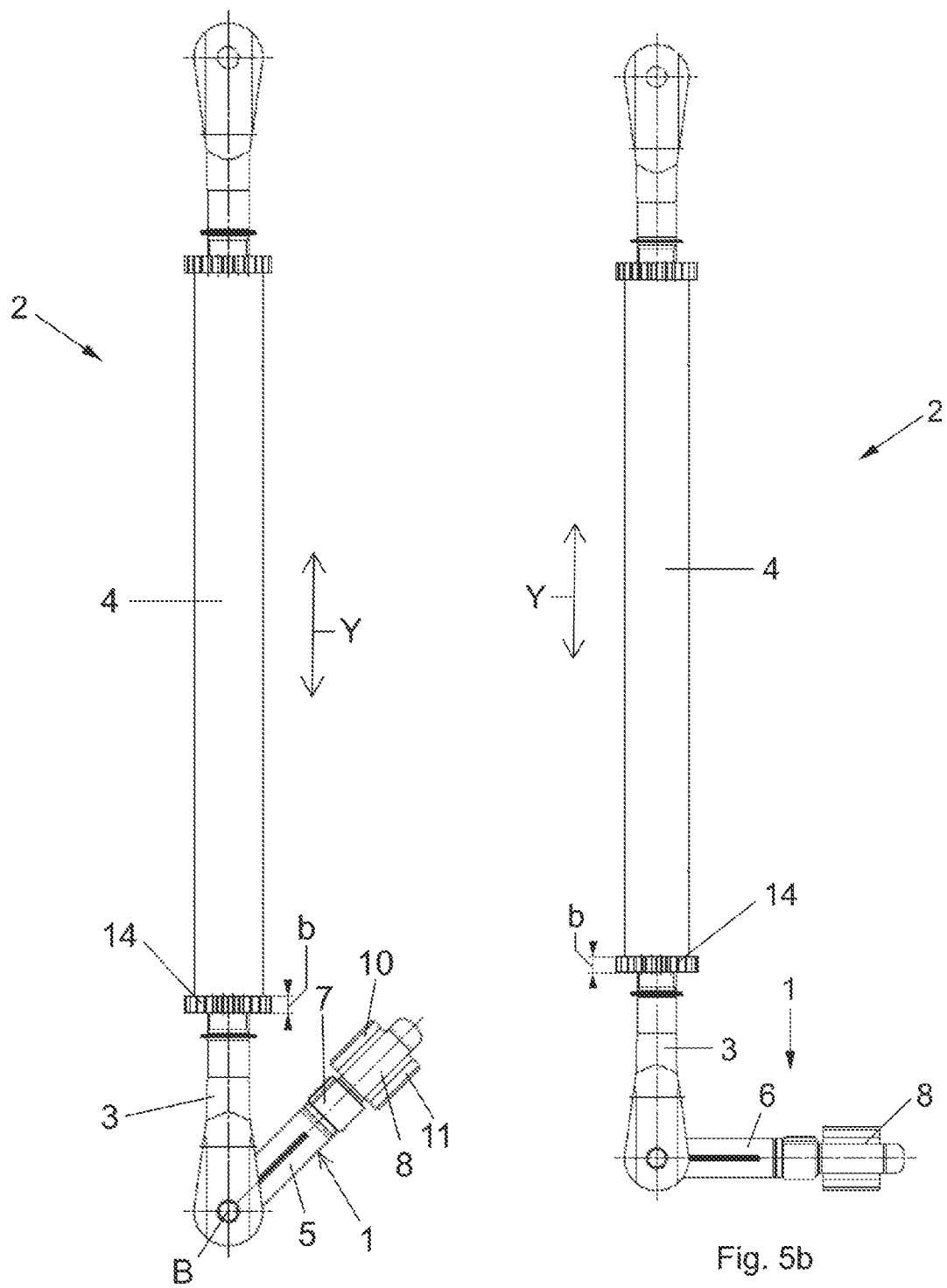

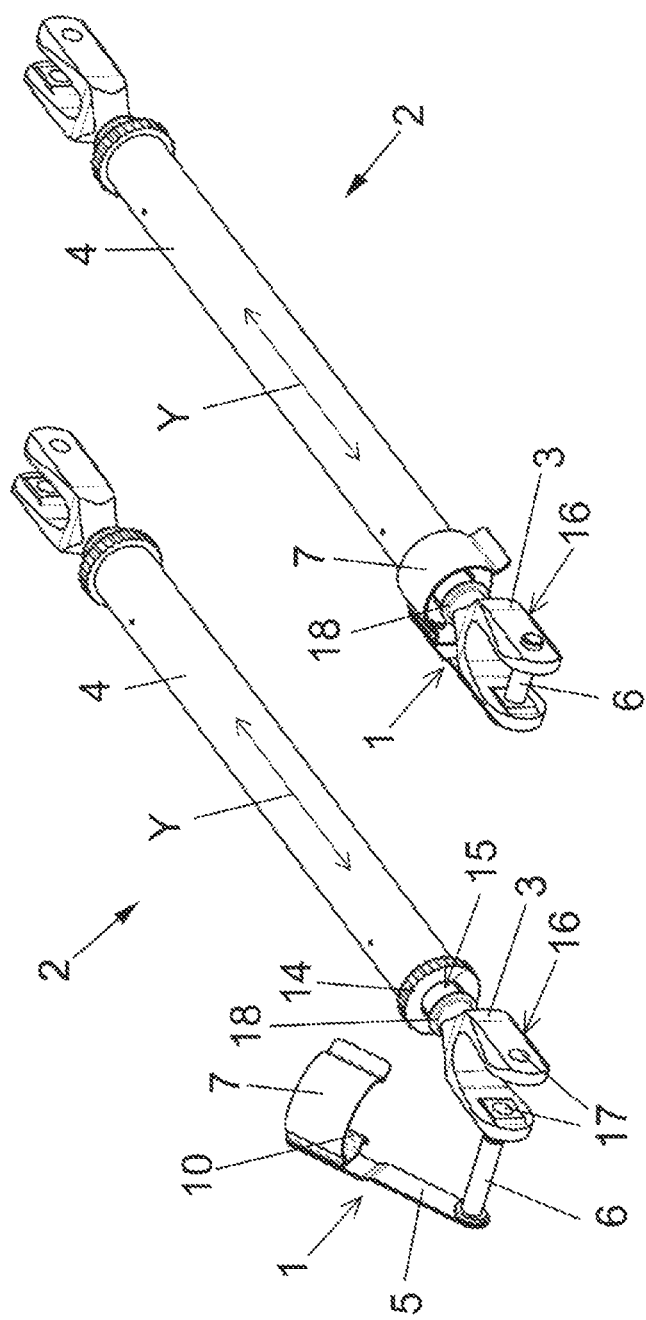

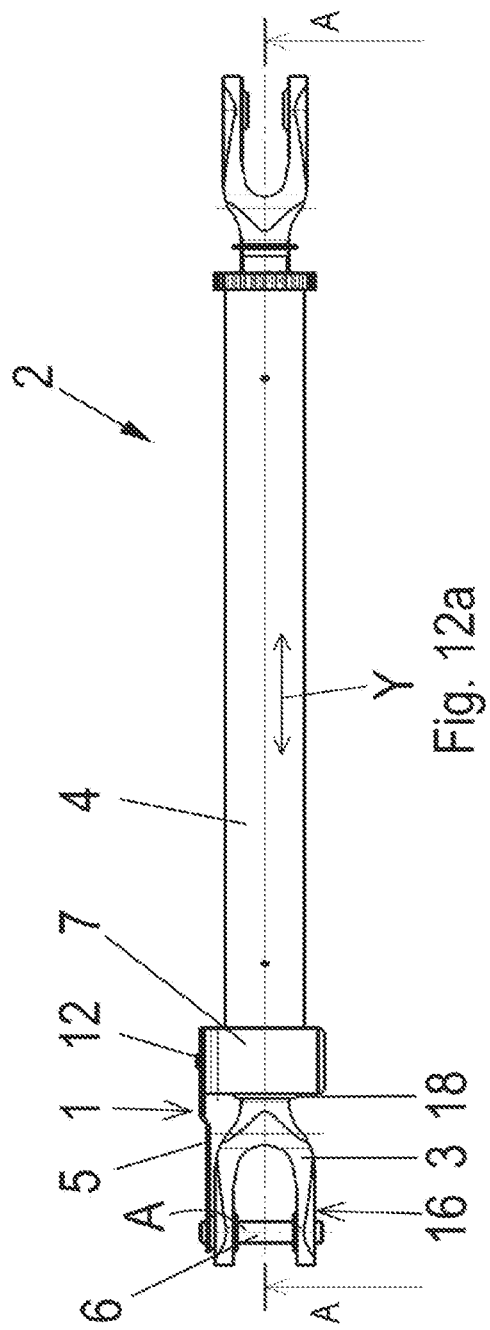
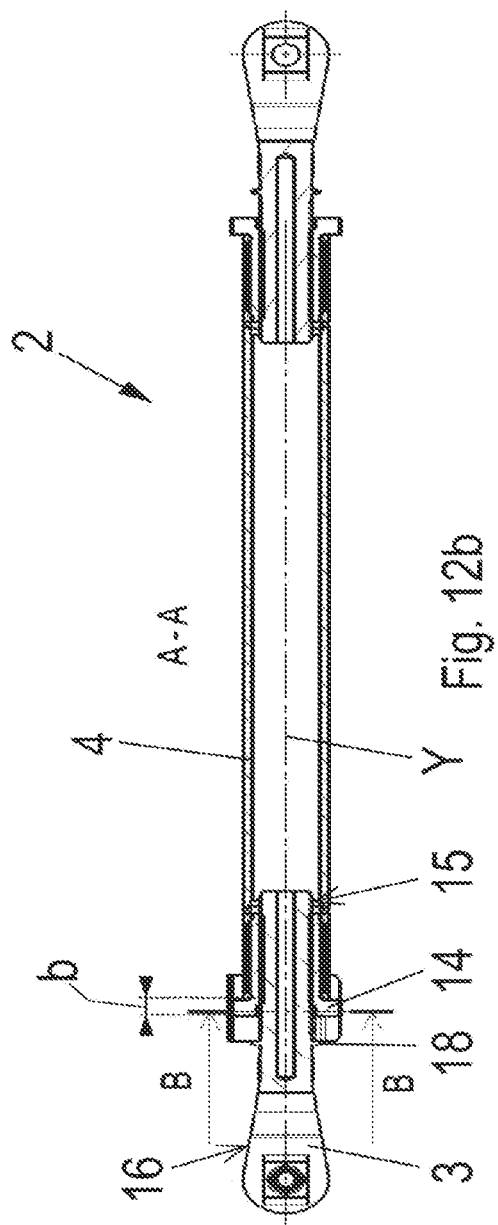

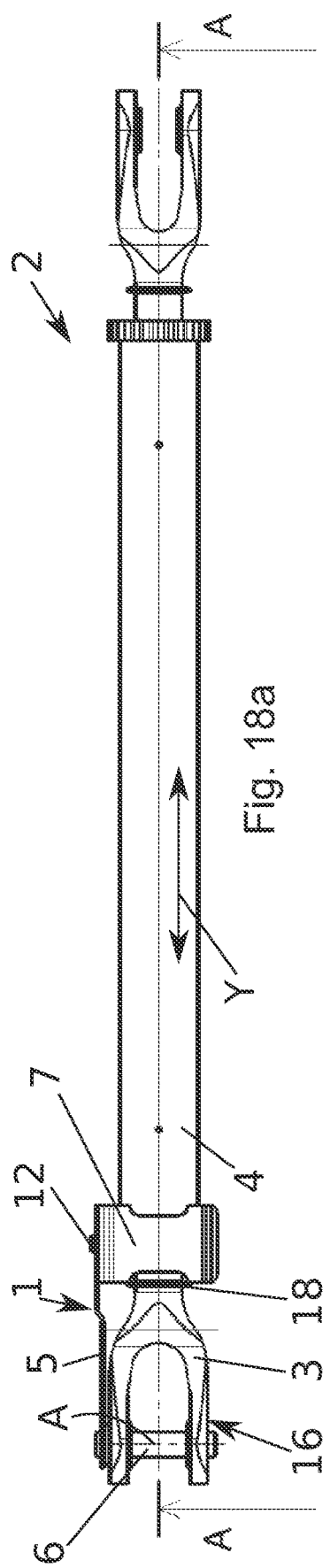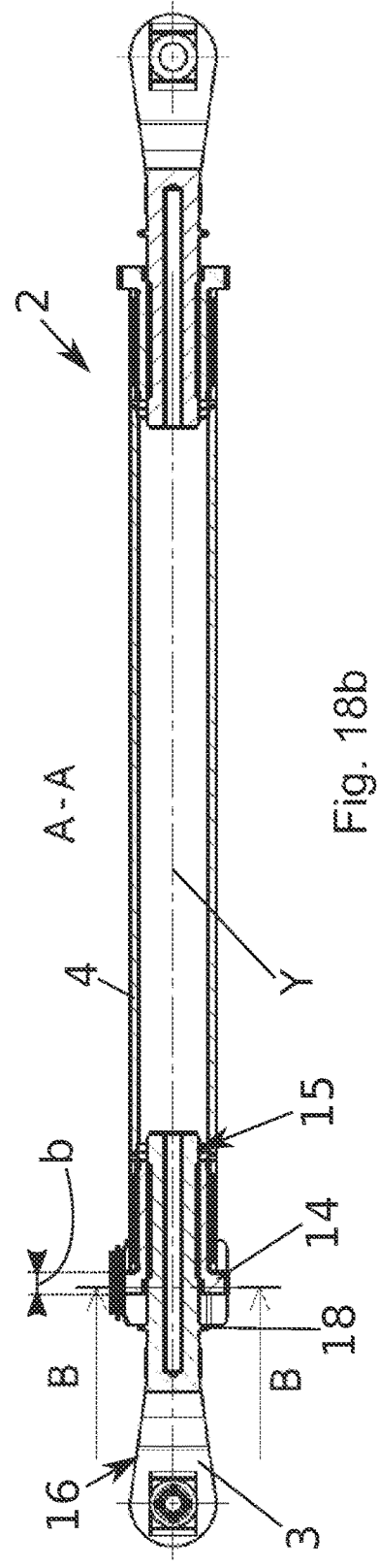

LOCKING ELEMENT FOR RELEASABLY LOCKING A ROTATIONAL MOVEMENT OF AN ADAPTER RELATIVE TO A BODY OF A PUSH-PULL ROD, AND PUSH-PULL ROD COMPRISING SUCH A LOCKING ELEMENT

CROSS REFERENCE TO RELATED APPLICATIONS

The present application is a U.S. National Phase of International Application No. PCT/AT2020/060356 entitled "LOCKING ELEMENT FOR RELEASABLY LOCKING A ROTATIONAL MOVEMENT OF AN ADAPTER RELATIVE TO A BODY OF A PUSH-PULL ROD, AND PUSH-PULL ROD COMPRISING SUCH A LOCKING ELEMENT," and filed on Oct. 7, 2020. International Application No. PCT/AT2020/060356 claims priority to Austrian Patent Application No. GM 50176/2019 filed on Oct. 7, 2019. The entire contents of each of the above-listed applications are hereby incorporated by reference for all purposes.

TECHNICAL FIELD

The disclosure relates to a locking element for releasably locking the rotational movement of an adapter relative to a body of a push-pull rod, comprising a lever arm and a pin connected to the lever arm, a snap-action element and a latching element.

The disclosure also relates to a push-pull rod with such a locking element, an adapter and a body.

BACKGROUND AND SUMMARY

Push-pull rods are used for example in aviation. They usually comprise a body, which usually comprises a tubular section, and an adapter at at least one end of the body or partially received into the body from one end of the body. The push-pull rod can be assembled by means of the adapter or adapters. Push-pull rods are usually adjustable in length, in order to be able to carry out an adaptation to a given distance from assembly points or tolerance compensation. The adapter and the body are rotatable relative to one another and each comprises a thread. A thread can be provided for example on a section of the inner lateral surface of the body and on a section of the outer lateral surface of the adapter. The length of the push-pull rod can thus be changed by a rotational movement of the adapter relative to the body.

A corresponding locking element is usually provided for the releasable locking of the rotational movement of the adapter relative to the body. Said locking element on the one hand comprises a pin, which can be inserted into eyelets of the adapter. The locking element also usually comprises a snap-action element for snapping on or around the lateral surface of the body and a latching device for cooperating with a counter-element on the body and thus for the releasable locking (blocking) of the rotational movement of the adapter relative to the body. The pin is first inserted into the eyelets of the adapter and the locking element is then folded in such a way that the snapping element snaps home on the counter-element on the body. Such a push-pull rod is described for example in DE 20 2004 016 321 U1.

The fitting or assembly of a push-pull rod often has to take place under confined spatial conditions and with limited accessibility, for example during the assembly of the overhead luggage compartments in aircraft. It can often happen that an acceptable accessibility is only present at all from the direction from which the pin is inserted into the adapter of the push-pull rod (for example in the aircraft in the longitudinal direction of the aircraft from the front to the rear), and from a second direction. The alignment of the second direction could mean, for example, that the locking element, after introduction of the pin into the adapter, can only be folded from below upwards, since there is no accessibility from above. Thus, an adapter, as in DE 20 2004 016 321 U1, could however be assembled only on one side of the aircraft in this manner and therefore practicably; this would not be possible on the second side, since here mirror-inverted conditions would be present.

It is therefore a task of the disclosure to create a locking element for a push-pull rod of the aforementioned type as well as a push-pull rod with such a locking element, which permit easy assembly even with restricted accessibility. The locking element or the push-pull rod equipped therewith should be easily used, i.e. can be opened and closed, under both variants of inversely restricted spatial conditions, and two different types of locking elements or push-pull rods should not be required for this purpose. Also, the latter should enable a reliable releasable locking of the relative rotational movement of the adapter relative to the body and should also be produced in a robust and straightforward manner.

This task is solved by a locking element as described at the outset, wherein the snap-action element is connected rotatably to the lever arm.

In this way, the direction of the snap-action element can be changed, in which the lever arm has to be swivelled after introduction of the pin into an adapter of a push-pull rod, in order to lead to a releasable locking of a rotational movement of the adapter relative to the body of a push-pull rod. The assembly with restricted accessibility is thus markedly improved.

In a state assembled on the push-pull rod (on the body and/or the adapter) the snapping element engages with the push-pull rod, as the case may be under the cooperation (by counter-pressure) of the latching device and/or the lever arm. The latching device is designed for the releasable locking of a rotational movement of the adapter relative to the body, in particular by cooperation with or engagement in a counter-element of the push-pull rod. The snap-action element is designed such that it pushes the push-pull rod against the latching device in a state assembled on a push-pull rod. The lever arm can for example be formed plate-shaped. The pin may be located in the vicinity of the one end of the lever arm. The snap-action element may be located at the same side of the lever arm as the pin and/or the latching device. The snap-action element can be rotated through at least 180°. However, the locking element can be designed such that a complete rotation of the snap-action element through 360° is prevented. The snap-action element can be arranged in a section of the lever arm projecting in the direction of the pin. It is possible for the snap-action element to comprise the latching device. The snap-action element and the latching device are spaced apart especially by the pin in the longitudinal extension direction of the lever arm.

The assembled state is understood to mean the state in which the pin of the locking element is inserted into an adapter of a push-pull rod and the snap-action element is snapped into or locked with the push-pull rod. The lever arm then runs in particular along or parallel to the push-pull rod. Releasable locking is understood in particular to mean that the latching device, such as together with the snap-action element, counteracts a rotational movement of the adapter relative to the body in the assembled state and thus prevents an undesired rotation of the adapter and with respect to the body and thus an undesired change in the length of the push-pull rod. A multiplicity of relative rotational positions of the adapter with respect to the body can be provided, in which this effect can be deployed. In particular, a rotational movement in the assembled state (without destroying the locking element or other components of the push-pull rod) can be prevented. In this case, for the change in length of the push-pull rod the lever arm with the snap-action element must be folded away from the push-pull rod and then be folded up again for the locking. Furthermore, the rotational movement in the assembled state can be acted upon such that it releasably blocks with a predetermined locking force in a plurality of rotational positions. In this case, the adapter can also be rotated in the assembled state relative to the body by applying a sufficient torque.

The snap-action element of the locking element comprises in particular an undercut, which allows the push-pull rod to be encompassed. The snap-action element may be constituted elastic, so that the push-pull rod can be brought behind the undercut. The snap-action element may comprise a bent-up end, which can make it easier to bend up the snap-action element in a corresponding elastic manner when it is to be snapped home with the push-pull rod. It can also be designed such that, after the introduction of the pin, the elastic bending of the snap-action element is effected by itself during the subsequent swivelling of the lever arm, since said snap-action element is pressed in the corresponding direction by the action of the body and/or adapter on the bent-up end. After overcoming the undercut, the snap-action element snaps or locks home.

The locking element does not comprise the adapter and the body of a push-pull rod, but rather is designed to cooperate with the latter. In order to enable a definition of the locking element without reference to a specific body and/or adapter of a push-pull rod, a snap-action element can be understood to mean any device which can be snapped home with any rod (as the case may be, in cooperation with the lever arm or the latching device).

The snap-action element can be designed so as to be arranged, in the assembled state, on the body and/or on the adapter of the push-pull rod. In an embodiment, the snap-action element comprises a partial ring which may be designed for arrangement on the adapter or the body of the push-pull rod in the locked (assembled) position. Since the adapter in the case of push-pull rods is usually inserted into the body and connected to the latter by means of a thread, it has a smaller diameter. In an embodiment, the snap-action element is designed for arrangement on the adapter in the assembled position, since it thus needs to have a smaller extension, as a result of which the assembly is simplified when there is restricted accessibility. Alternatively or in addition, the snap-action element can be designed angular. In particular, a straight plate-shaped section can adjoin the partial ring. The snap-action element, in particular the partial ring, can also be provided for arrangement on the body in the assembled position. This is useful in the case of short forms of embodiment, in particular short push-pull rods, since in this case there may be too little space on the adapter for the snap-action element to be reliably snapped into place.

In an embodiment, the snap-action element is rotatably connected to the lever arm in such a way that the snap-action element can assume at least a first and a second rotational position, wherein a snap opening of the snap-action element in the first rotational position points at least in a direction normal to the longitudinal extension of the pin and normal to the longitudinal extension of the lever arm and the second rotational position is orientated rotated by 180° to the first rotational position. Thus, especially when the pin is inserted into the adapter from the same direction, the locking can take place by swivelling the lever arm in both directions, depending on the rotational position.

Furthermore, the assembly is simplified under restricted accessibility if the snap-action element can be rotated with the lever arm about an axis of rotation parallel to the pin.

In an embodiment, the latching element is spaced apart from the snap-action element in the longitudinal extension direction of the lever arm. The snap-action element may be closer to the pin than the latching device. By separating the two functions of the snap-action element and the latching device, the rotatable connection of the snap-action element with the lever arm can be implemented structurally more easily. Furthermore, the stability and therefore the reliability of the latching device can thus be improved.

In an embodiment, the snap-action element and the latching device together enclose an angular range of more than 180° relative to the push-pull rod to be encompassed. This means that the snap-action element and the latching device together form at least one undercut (in the direction of the swivelling of the lever arm, i.e. normal to the lever arm and the pin). A particularly reliable connection can thus be provided. The snap-action device does not have to be able to perform the snap function on its own, but provision can be made such that the snapping action is only brought about together with the lever arm and/or the latching device.

The latching device comprises at least one locking nose. This can for example cooperate with a toothed ring of a body of a push-pull rod in the assembled state or engage in the latter or lock in the latter. The at least one locking nose may have a constant cross-section in the longitudinal extension direction of the lever arm. The cross-section of the locking nose may be rounded, so that a rotational movement of the adapter relative to the body in the assembled state is possible by means of a sufficient torque. The at least one locking nose can also snap home together with the snap-action element with the body or adapter. The latching device should be designed to cooperate with the body in order to be able to prevent or restrict a rotational movement of the adapter relative to the body.

Particularly reliable (releasable) locking can be achieved if the latching device has two locking noses. The latter can be designed to cooperate with a sprocket of a body of a push-pull rod. In an embodiment, they are designed to engage in recesses of the sprocket which are not adjacent to one another. The two locking noses may be spaced apart from one another by at least half of the greatest width extension of the lever arm in the region of the latching device. The provision of two locking noses results in an improved hold of the locking element in the locked position.

In an embodiment, the snap-action element is connected to the lever arm by a swivel joint. In an embodiment, the snap-action element in the assembled state rests on an area on one half of the body and/or the adapter and the latching device cooperates with the body or a counter-element of the body in an area which lies opposite this half; or the snap-action element is designed correspondingly. It is thus possible to avoid the swivel joint having to come into contact with the body or the adapter of the push-pull rod.

In an embodiment, the snap-action element comprises a plate which rests on the lever arm. The stability can thus be improved or stability disadvantages, which could result from a two-part design of the lever arm and the snap-action element, can be avoided. It rests on a plate-shaped region of the lever arm. A reliable force transmission between the lever arm and the snap-action element is thus guaranteed.

The task of the disclosure is also solved by an aforementioned push-pull rod with an adapter and a body, wherein the push-pull rod comprises the locking element described above. The snap-action element is rotatable in a preparatory position, (i.e. in a non-assembled position). With regard to this aspect of the push-pull rod that can thus be achieved, reference is made to the above description of the locking element.

The push-pull rod may comprise two adapters, wherein an adapter is introduced into each of the two ends of the body. The push-pull rod may comprise a counter-element which can cooperate with the latching device or into which the latching device can engage. A form-fit connection to the releasable locking is thus possible. Alternatively or in addition, a friction-locked connection can be provided. In this case, there is also no need to provide a counter-element.

A spring element may be provided with presses the thread of the body and the thread of the adapter against one another, as a result of which the stability can be improved. Furthermore, undesired noises can thus be avoided. The latching device has a greater longitudinal extension in the longitudinal extension direction of the push-pull rod than the counter-element (in the assembled state).

In an embodiment, the snap-action element can be rotated in a preparatory position about an axis of rotation which is normal to the longitudinal extension direction of the push-pull rod in the assembled state of the locking element. The preparatory position is the position in which the lever arm is not folded over the body or adapter and the snap-action element is thus not snapped home with the latter.

In an embodiment, the body has a sprocket, into which the at least one locking nose of the latching device is designed to be able to engage. That is to say that a sprocket is provided as a counter-element. Releasable locking of the rotational movement of the adapter relative to the body in a multiplicity of rotary positions is possible by means of the sprocket.

The latching device is designed longer in the longitudinal extension direction of the push-pull rod than the width of the sprocket. Production can thus be simplified. The latching device, in particular the at least one locking nose, may have a width in the longitudinal extension direction of the push-pull rod that is greater than the length by which the push-pull rod can be adjusted. This thus ensures that the latching device can engage in the sprocket in any length adjustment of the push-pull rod. If the latching device is provided on the snap-action element and/or the latter are formed in one piece, the latching device (in particular the locking nose) and the snap-action element (in particular the partial ring) may have a width in the longitudinal extension direction of the push-pull rod (in the assembled position) which is greater than the length by which the push-pull rod can be adjusted.

In an embodiment, the snap-action element partially encompasses the adapter in the assembled state of the locking element. On the one hand, assembly in restricted spatial conditions can thus be improved, since the dimensions of the snap-action element can be smaller. Furthermore, the stability can be improved by the more compact design. Thus, for example, when a sprocket is provided on the body, the snap-action element does not have to rest on the latter, but rather can rest on a tubular section of the adapter.

In an embodiment, the adapter has a cylindrical lateral surface, the longitudinal extension of which in the longitudinal extension direction of the push-pull rod corresponds at least to the longitudinal extension of the snap-action element or, in particular, a partial ring of the snap-action element. The reliability of the snapping can thus be improved.

Restrictions, for example one or more protrusions, can be provided around a section or on an edge side of a section of the body and/or the adapter, against which the snap-action element rests in the assembled state. They can improve the stability, in particular with regard to the ability of the snap-action element to rotate.

The snap-action element comprises spring steel. The stability, in particular even after repeated elastic deformation, can thus be improved. The lever arm and/or the latching device can comprise spring steel.

BRIEF DESCRIPTION OF THE FIGURES

The disclosure is explained in greater detail below with the aid of certain embodiments of the locking element and the push-pull rod shown in the figures. The figures show in detail:

FIG. 2b a cross-sectional view of the same locking element as in FIG. 1a;

FIG. 3a the same locking element as in FIG. 1a in the position of FIG. 1d from the front;

FIG. 3b the same locking element as in FIG. 1a in the position of FIG. 1d from behind;

FIG. 3c the same locking element as in FIG. 1a in the position of FIG. 1d from the side;

FIG. 3d the same locking element as FIG. 1a from the side;

FIG. 5a the same push-pull rod as in FIG. 4a with the locking element in a partially folded-away state from the side;

FIG. 5b the same push-pull rod as in FIG. 4a with the locking element in a folded-away state from the side;

FIG. 10b the same locking element as FIG. 8a in a cross-sectional view through plane C-C of FIG. 9a;

FIG. 11a a further embodiment of the push-pull rod according to the disclosure with the locking element of FIG. 8a before its assembly;

FIG. 11b the same push-pull rod as FIG. 11a with the locking element in the assembled state;

FIG. 12a the same push-pull rod as FIG. 11a from the side with the locking element in the assembled state;

FIG. 12b the same push-pull rod as FIG. 11a in a cross-sectional view through plane A-A of FIG. 12a;

FIG. 16b the same locking element as FIG. 14a in a cross-sectional view through plane C-C of FIG. 15a;

FIG. 18a the same push-pull rod as FIG. 17a from the side with the locking element in the assembled state;

FIG. 18b the same push-pull rod as FIG. 17a in a cross-sectional view through plane A-A of FIG. 18a.

DETAILED DESCRIPTION

Figure 1A:
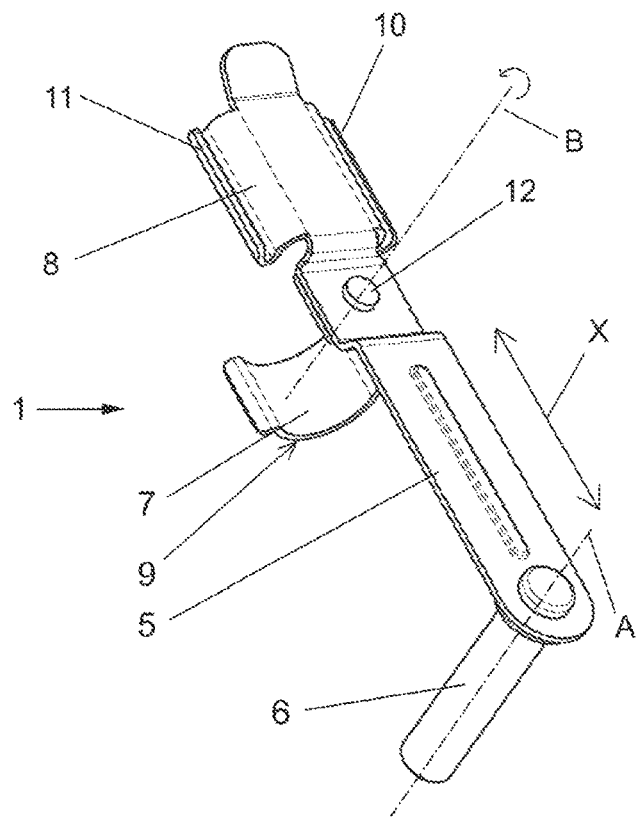
FIG. 1a an embodiment of the locking element according to the disclosure in an oblique view from behind.
Figure 1B:
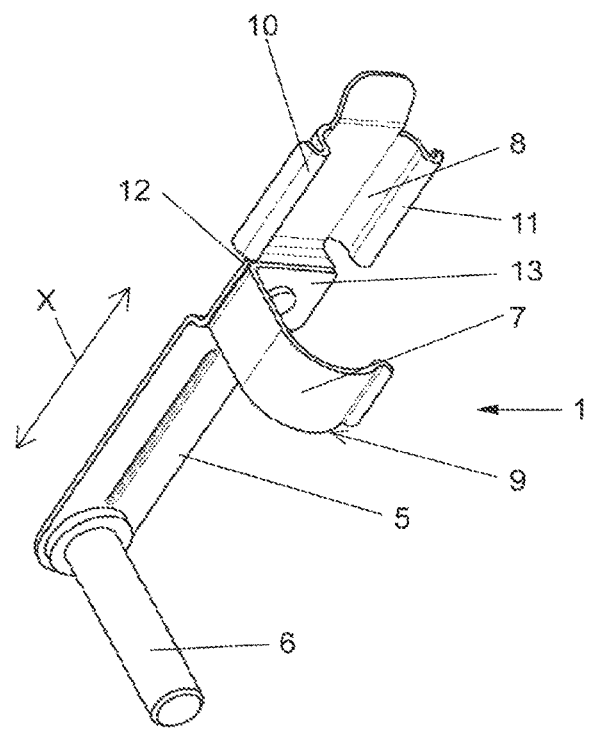
FIG. 1b the same locking element as FIG. 1a obliquely from the front.
Figures 4A, 4B:
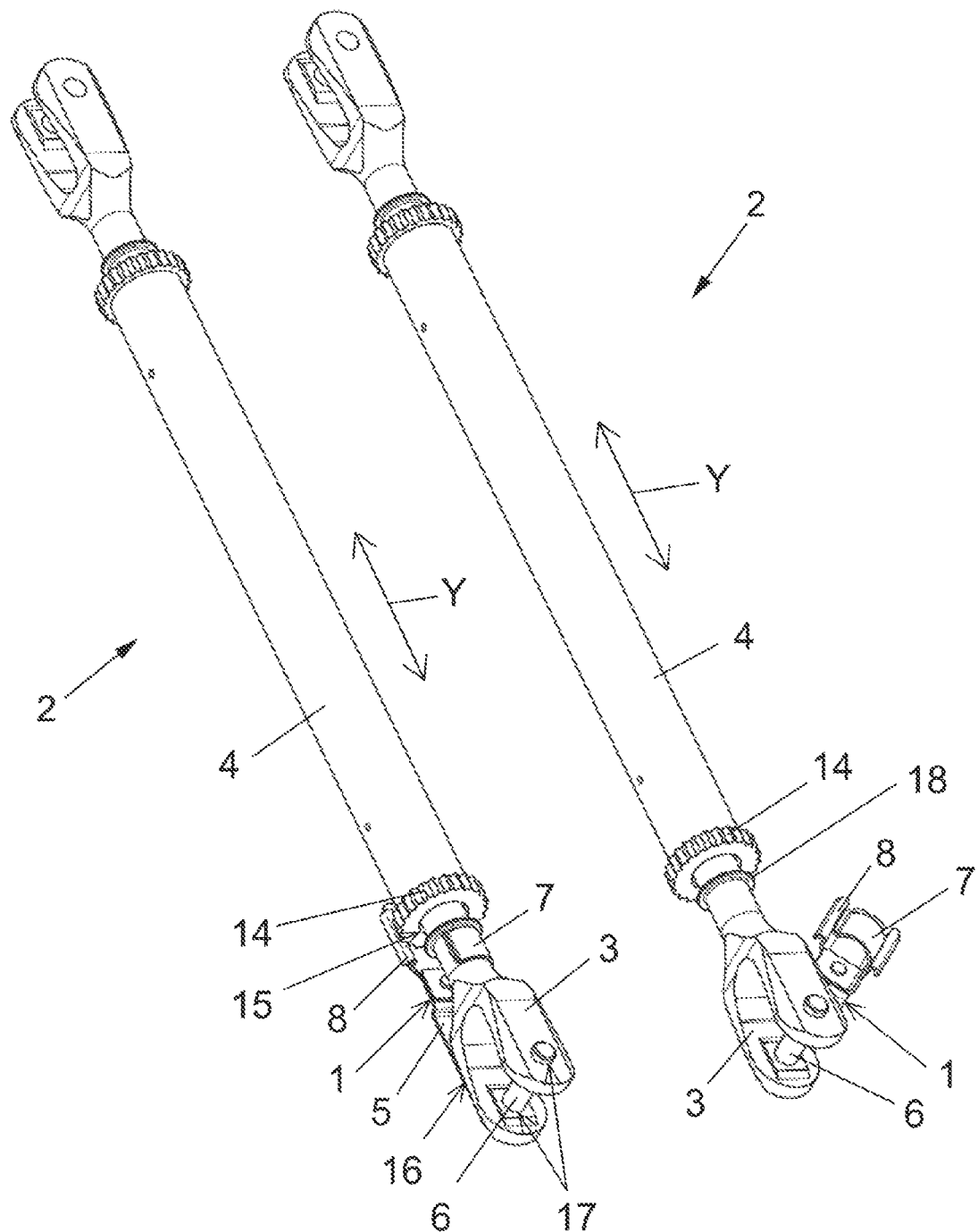
FIG. 4a an embodiment of the push-pull rod according to the disclosure with the locking element of FIG. 1a in the assembled state.
FIG. 4b the same push-pull rod as in FIG. 4a with the locking element in a partially folded-away state.

FIG. 1a to 1d, 2a to 2d and 3a to 3d show an embodiment of the same locking element 1 for the releasable locking of an adapter 3 relative to a body 4 of a push-pull rod 2 (see for example FIGS. 4a and 4b). FIG. 1a to 1 d show locking element 1 in an oblique view, FIGS. 2a and 2c in a transverse view, FIGS. 2b and 2d in a cross-sectional view and FIGS. 3a to 3d in a plan view from the front, behind and the sides.

Figure 7A:
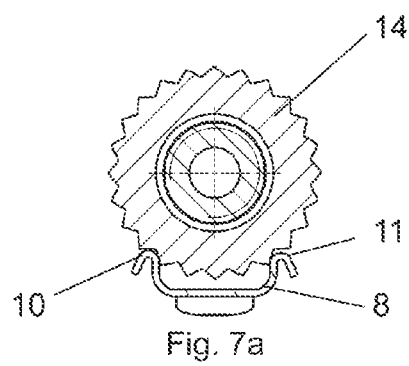
FIG. 7a a cross-sectional view along with the latching device of FIG. 6e.
Figure 7B:
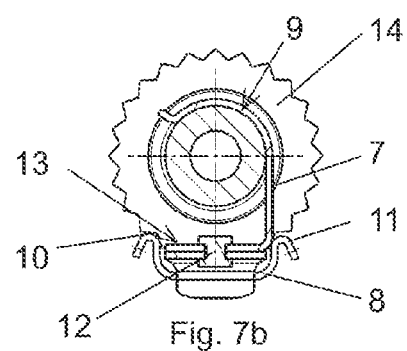
FIG. 7b a cross-sectional view as in FIG. 6e, which shows the axis of rotation of the snap-action element.
Figure 7C:
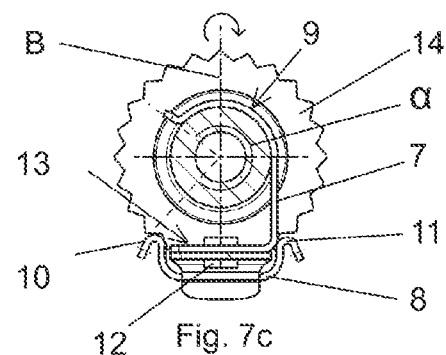
FIG. 7c a cross-sectional view as in FIG. 7b away from the axis of rotation of the snap-action element.
Figure 7D:
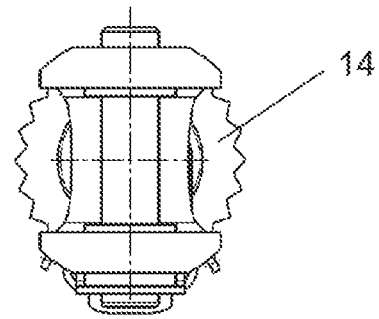
FIG. 7d a side view of the push-pull rod of FIG. 6e.

Locking element 1 comprises a lever arm 5 and a pin 6 connected to lever arm 5. Furthermore, locking element 1 comprises a snap-action element 7 and a latching device 8. Snap-action element 7 is connected to lever arm 5 so as to be rotatable about an axis of rotation B. Axis of rotation B is arranged parallel to longitudinal extension direction A of pin 6. Snap-action element 7 comprises a partial ring 9, which in the locked position is designed for arrangement on adapter 3 of push-pull rod 2 (see for example FIGS. 4a, 7b and 7c). Latching device 8 is connected to lever arm 5.

Figure 1C:
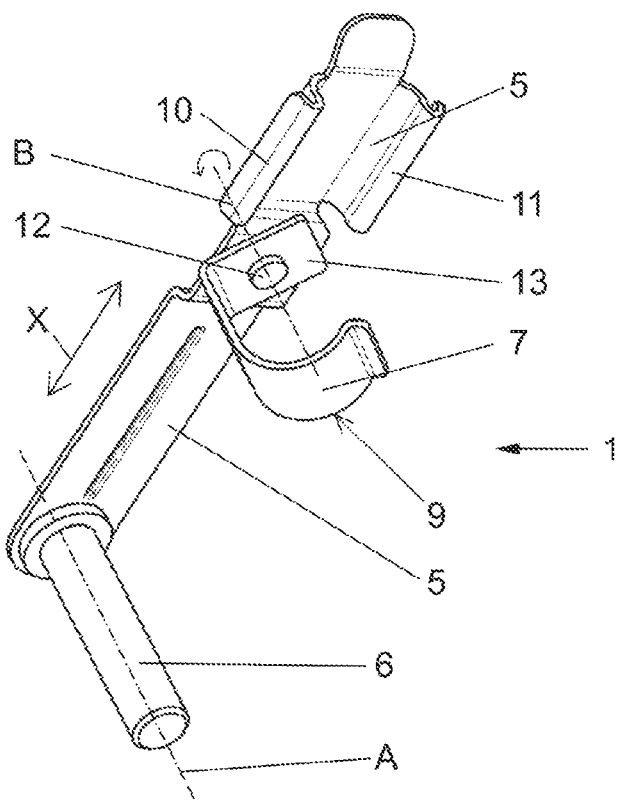
FIG. 1c the same locking element as FIG. 1a with a snap-action element rotated by a small angle.
Figure 1D:
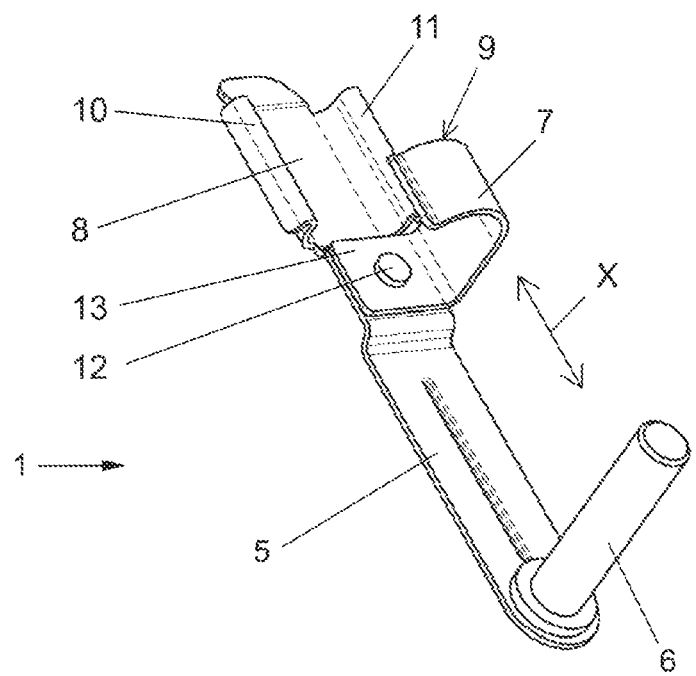
FIG. 1d the same locking element as FIG. 1a with a snap-action element rotated by 180°.
Figure 2A:
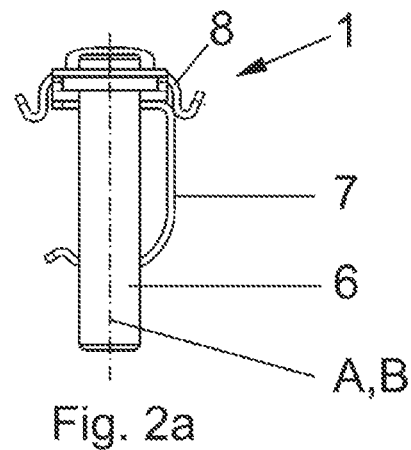
FIG. 2a the same locking element as FIG. 1a in a cross-sectional view.
Figure 2B:
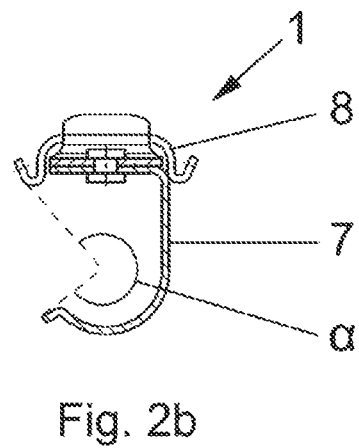
Figure 2C:
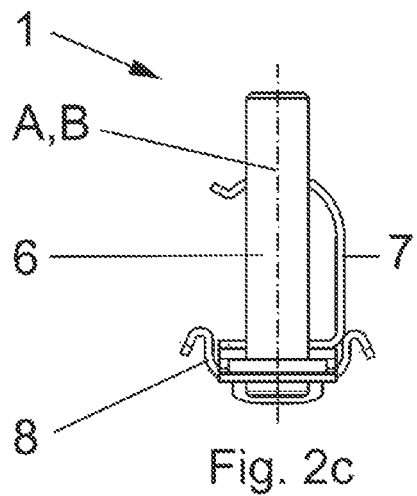
FIG. 2c the same locking element as FIG. 1a in the position of FIG. 1d in a cross-sectional view.
Figure 2D:
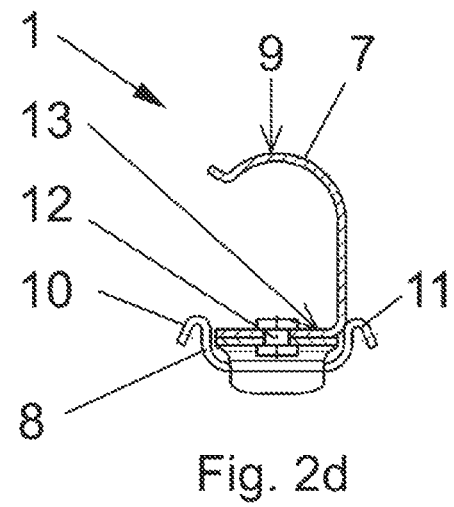
FIG. 2d a cross-sectional view of the same locking element as in FIG. 1a in the position of FIG. 1d.

Snap-action element 7 is rotatably connected to lever arm 5 in such a way that snap-action element 7 can assume at least a first and a second rotational position, wherein a snap opening of snap-action element 7 in the first rotational position points at least in a direction normal to longitudinal extension direction A of pin 6 and normal to longitudinal extension direction X of lever arm 5 and the second rotational position is orientated rotated by 180° to the first rotational position. FIGS. 1a, 1b, 2a, 2b and 3d show snap-action element 7 in the first rotational position and FIGS. 1d, 2c, 2d and 3a show snap-action element 7 in the second rotational position. FIG. 1c shows a transitional rotational position in which snap-action element 7 is rotated only through a smaller angle about axis of rotation B. It can also be seen from the figures that snap-action element 7 is connected to lever arm 5 rotatably about an axis of rotation B parallel to pin 6. The longitudinal axis of pin 6 is denoted by A.

In the embodiment shown, latching device 8 is spaced apart from snap-action element 7 in longitudinal extension direction X of lever arm 5. Specifically, latching device 8 is arranged farther away from pin 6 on lever arm 5 than snap-action element 7. It is also possible for latching device 8 and snap-action element 7 not to be spaced apart from one another. For example, snap-action element 7 could comprise latching device 8. Latching device 8 could thus be rotatable together with snap-action element 7.

Snap-action element 7 and latching device 8 have together, relative to a push-pull rod 2 to be encompassed, an angle range a of more than 180°. As the centre-point for the calculation of the angle range a, a rod with a cylindrical lateral surface in sections is assumed, wherein the cylindrical lateral surface assumes the maximum possible diameter in each case in the region of latching device 8 and snap-action element 7, wherein the centre-points of the cylindrical lateral surface remain the same. Angle range a is based on the maximum angle range covered, even if the cover takes place at different depths of longitudinal extension direction X of lever arm 5.

In the shown embodiment, latching device 8 comprises two locking noses 10, 11. Snap-action element 7 is rotatably connected to lever arm 5 by means of swivel joint 12. Snap-action element 7 comprises a plate 13, which rests on a plate-shaped section of lever arm 5.

FIGS. 4a, 4b, 5a, 5b, 6a to 6e and 7a to 7d show an embodiment of a push-pull rod 2 with locking element 1 already described in connection with FIG. 1a to 3d. FIGS. 4a and 6a to 7d show locking element 1 in the assembled state, in which a rotational movement of an adapter 3 relative to body 4 of push-pull rod 2 is locked (i.e. blocked). In FIGS. 4b, 5a and 5b, locking element 1 or lever arm 5 is folded away from body 4 or from adapter 3 of push-pull rod 2. In this preparatory position, adapter 3 can be rotated relative to body 4 and the length of push-pull rod 2 can thus be changed. Pin 6 does not have to be inserted into adapter 3 in the preparatory position. Snap-action element 7 is rotatable in the preparatory position about axis of rotation B, which is normal to longitudinal extension direction Y of push-pull rod 2 in the assembled state of locking element 1.

Figure 6A:
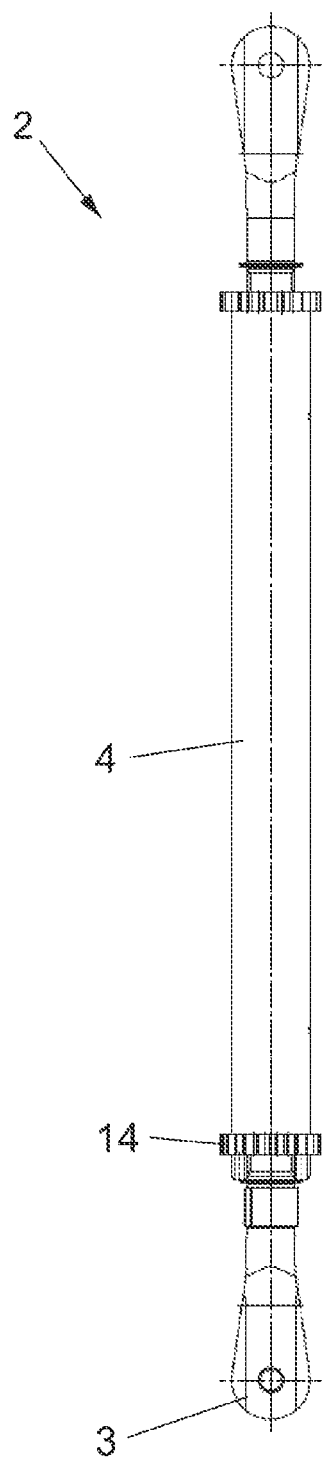
FIG. 6a the same push-pull rod as in FIG. 4a with the locking element in an assembled state from the side.
Figure 6B:
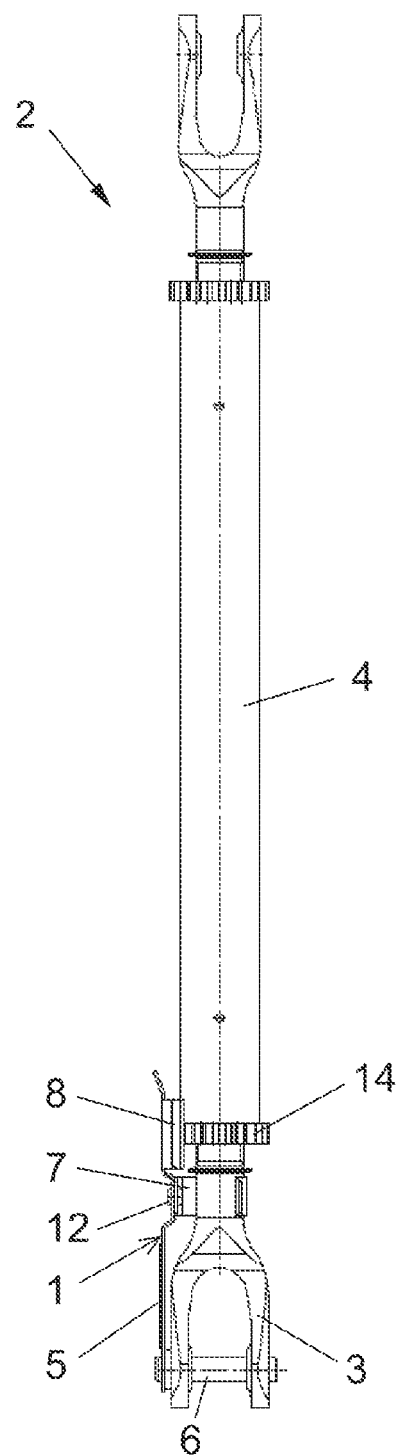
FIG. 6b the same push-pull rod as in FIG. 4a with the locking element in an assembled state from the other side.
Figure 6C:
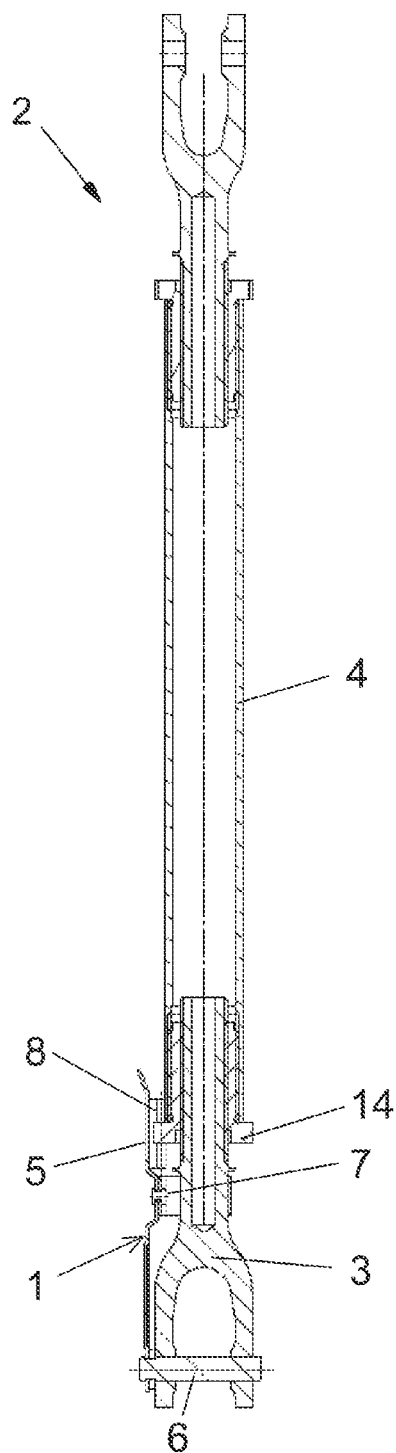
FIG. 6c a cross-sectional view of the push-pull rod of 6b.
Figure 6D:
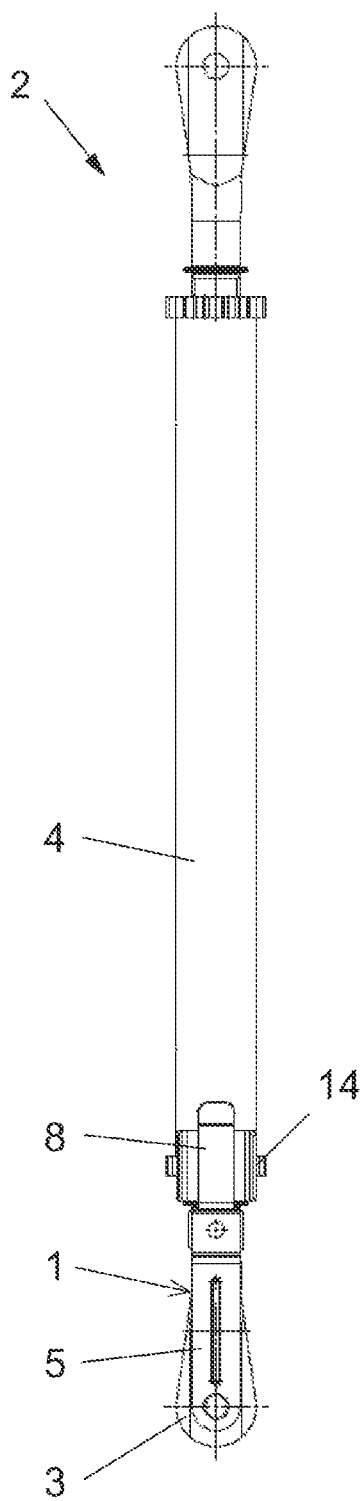
FIG. 6d the push-pull rod in the same view as in FIG. 6a with the locking element in an assembled state from the other side.
Figure 6E:
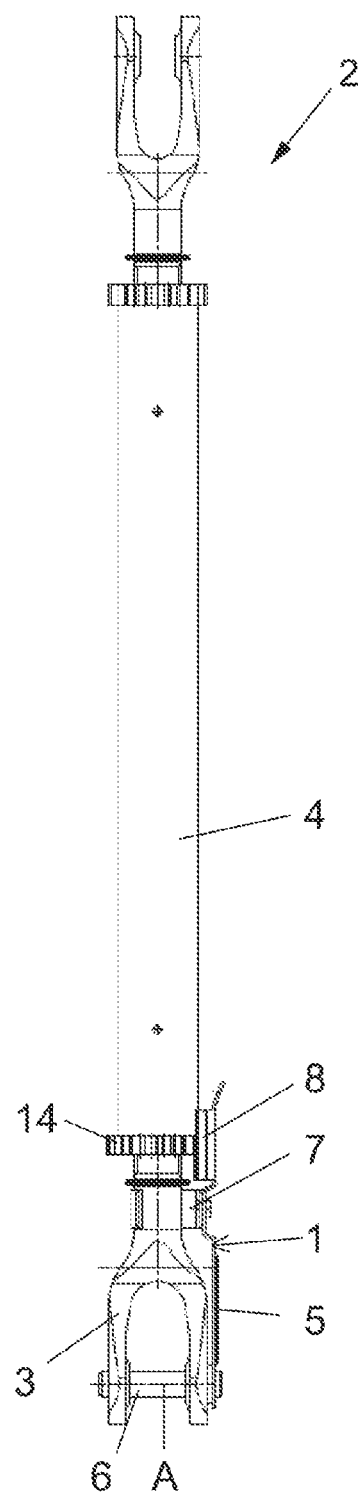
FIG. 6e the push-pull rod in the same view as in FIG. 6b with the locking element in an assembled state from the other side.

FIGS. 4a and 4b show push-pull rod 2 in an oblique view, FIG. 5a, 5b, 6a, 6b from the one side, FIGS. 6b and 6e from the other side, FIG. 6c in a cross-section along the same side as FIG. 6b, and FIGS. 7a to 7d cross-sections through a plane normal to longitudinal extension direction Y of push-pull rod 2.

Push-pull rod 2 comprises a second adapter partially pushed into body 4 at its second end. In the shown embodiment, the second adapter is not locked to body 4 with a locking element 1; however, this would of course be possible.

Adapter 3 comprises a cylindrical section 15 and a fork-shaped end section 16. Cylindrical section 15 is for the most part pushed into body 4. Cylindrical section 15 comprises a thread on its outer lateral surface which cooperates with a thread provided on an inner lateral surface of body 4 (not shown). Adapter 3 comprises two eyelets 17 in cylindrical section 15, through which pin 6 is guided. Furthermore, adapter 3 comprises on its cylindrical section 15 a restriction 18 in the form of a circumferential projection. In the assembled state, snap-action element 7, in particular partial ring 9 of the snap-action element, lies on cylindrical section 15 of adapter 3 between restriction 18 and fork-shaped end section 16 and thus partially encompasses adapter 3. Accordingly, the longitudinal extension of the (purely) cylindrical lateral surface of adapter 3 in longitudinal extension direction Y of push-pull rod 2 corresponds at least to the longitudinal extension of snap-action element 7.

Body 4 comprises a sprocket 14 at an end section of its cylindrical lateral surface, into which the two locking noses 10, 11 of latching device 8 are designed to engage or into which the two locking noses 10, 11 engage in the assembled position. In order to enable, even when there is a change in the length of push-pull rod 2, cooperation of latching device 8 and a counter-element of push-pull rod 2, specifically sprocket 14 of body 4, at least one of the two must have a corresponding extension in longitudinal extension direction Y of push-pull rod 2. In the present embodiment, the two locking noses 10, 11 of latching device 8 are constituted longer in longitudinal extension direction Y of push-pull rod 2 than width b of sprocket 14. Width b of sprocket 14, which is more difficult structurally, can thus be reduced, while locking noses 10, 11, which are easier to produce, have the necessary longitudinal extension.

Snap-action element 3, in particular partial ring 9, can for example be made of spring steel.

Push-pull rod 2 or locking element 1 is assembled as follows. The desired length of push-pull rod 2 is adjusted by a relative rotation of adapter 3 with respect to body 4. Snap-action element 7 is rotated into a desired rotational position and pin 6 is introduced into eyelets 13 of adapter 3. Lever arm 5 is then swivelled, so that snap-action element 7 snaps onto push-pull rod 2, in particular adapter 3. Latching device 8 now engages in sprocket 14 of body 4 of push-pull rod 2.

Figure 8A:
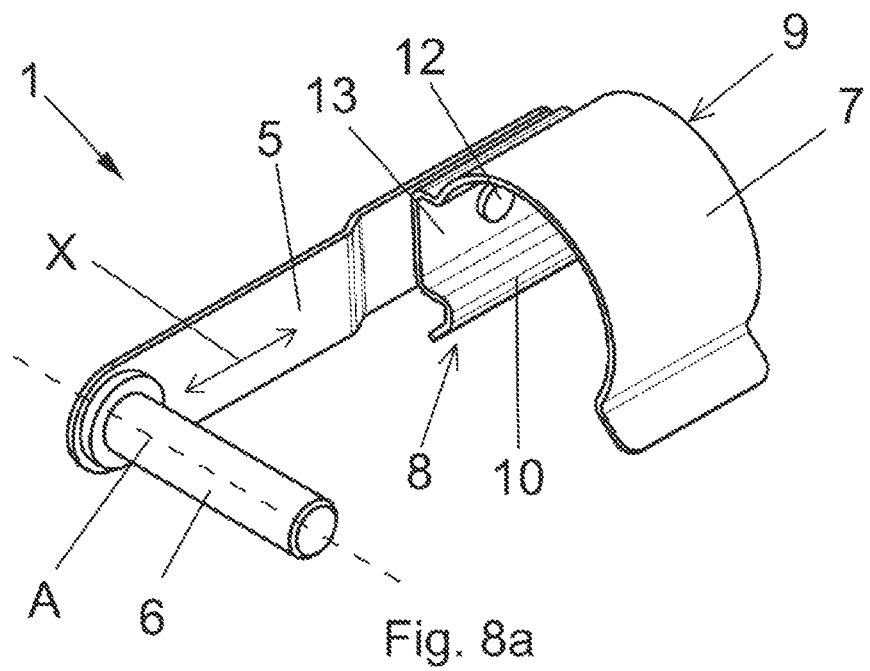
FIG. 8a a further embodiment of the locking element according to the disclosure in an oblique view from the front.
Figure 8B:
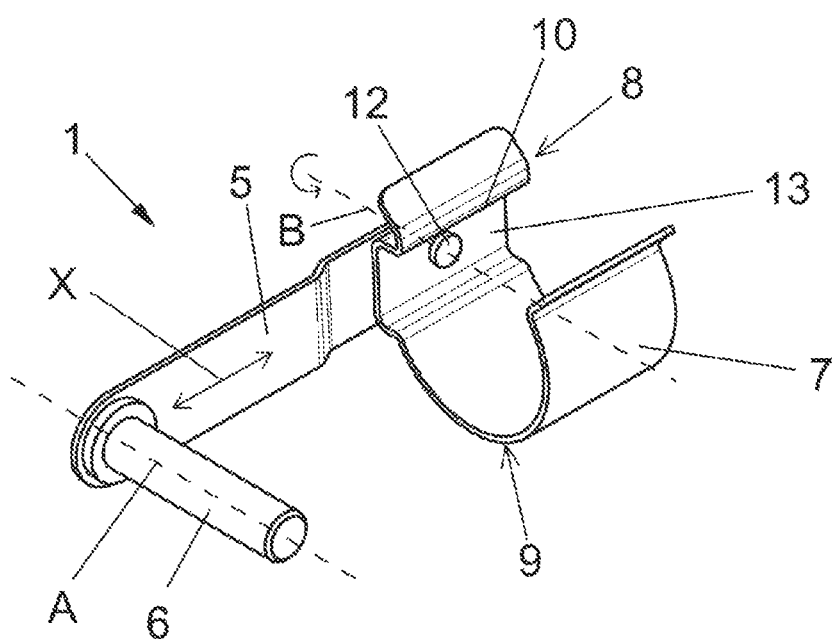
FIG. 8b the same locking element as FIG. 8a with a snap-action element rotated by 180°.
Figure 9A:
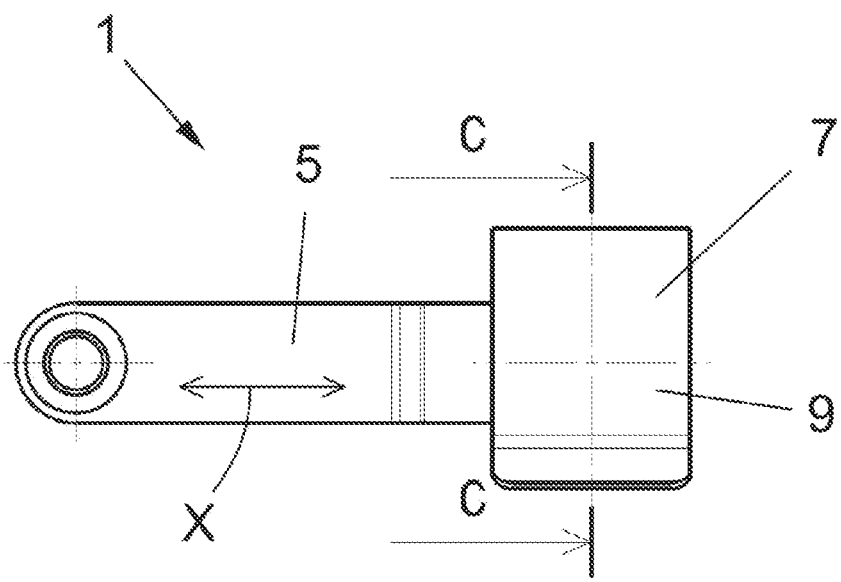
FIG. 9a the same locking element as FIG. 8a from the front.
Figure 9B:
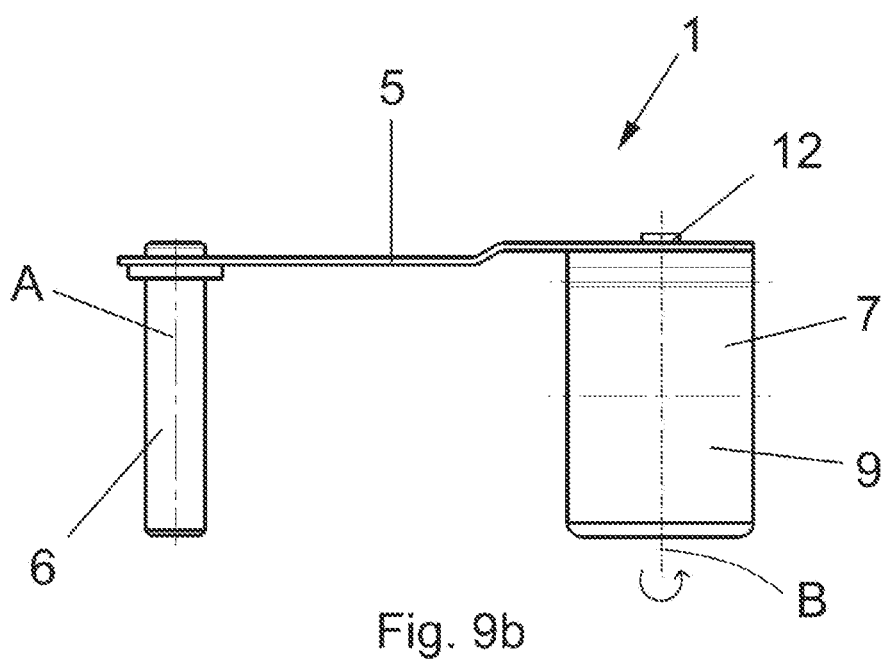
FIG. 9b the same locking element as FIG. 8a from the side.
Figure 10A:
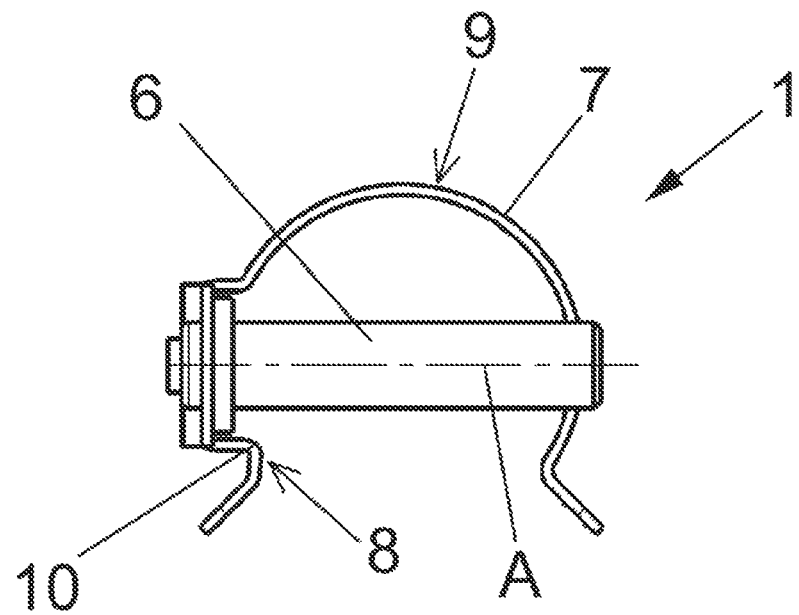
FIG. 10a the same locking element as FIG. 8a in a transverse view.
Figure 10B:
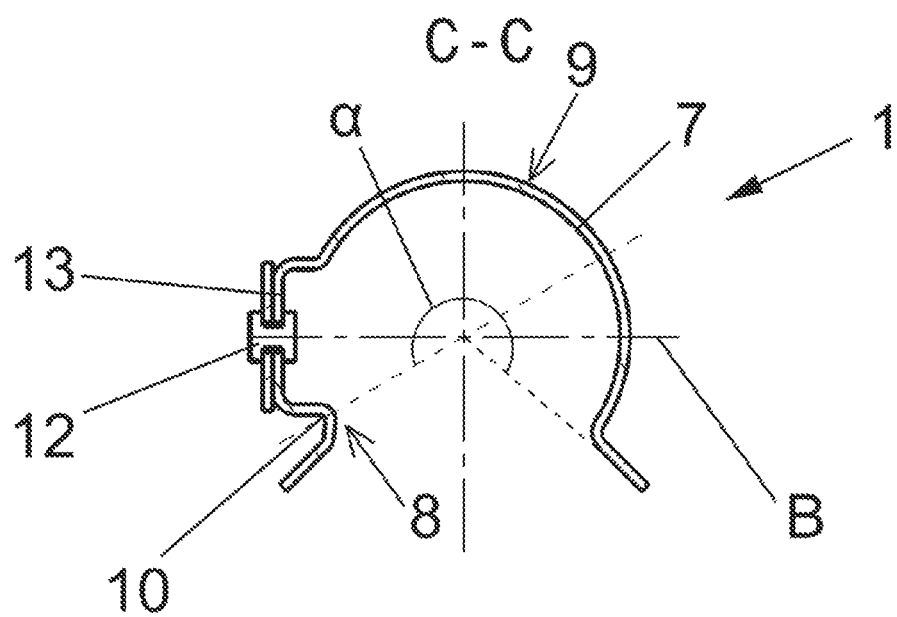

FIGS. 8a, 8b, 9a, 9b, 10a and 10b show an embodiment of the same locking element 1 for releasably locking adapter 3 relative to body 4 of push-pull rod 2 (see for example FIGS. 11a and 11b). FIGS. 8a and 8b show locking element 1 in an oblique view, FIGS. 9a and 9b in a plan view from the front and from the side, FIG. 10a in a transverse view and FIG. 10b in a cross-sectional view along plane C-C of FIG. 9a.

The embodiment shown in FIGS. 8a to 10b largely functions in the same way as the embodiment described above in connection with FIG. 1a to 3d. To avoid repetition, therefore, functionally identical parts are denoted by the same reference numbers and reference is made in this regard to the above description.

The clearest difference between the embodiment of FIGS. 8a to 10b and the embodiment of FIG. 1a to 3d is that snap-action element 7 and latching device 8 are made in one piece or snap-action element 7 comprises latching device 8. In common with snap-action element 7, latching device 8 is therefore also rotatably connected to lever arm 5. Snap-action element 7 and latching device 8 are rotatably connected to lever arm 5 about axis of rotation B in such a way that snap-action element 7 and latching device 8 can assume at least a first and a second rotational position, wherein a snap opening of snap-action element 7 in the first rotational position points at least in a direction normal to longitudinal extension direction A of pin 6 and normal to longitudinal extension direction X of lever arm 5 and the second rotational direction is orientated rotated by 180° to the first rotational position. In FIG. 8b, snap-action element 7 and latching device 8 are orientated rotated by 180° to the first rotational position. In FIG. 8b, snap-action element 7 and latching device 8 are rotated by 180° compared to FIG. 8a. If pin 6 is thus inserted in the same direction into adapter 3, adapter 3 can thus be releasably locked relative to body 4 by swivelling locking element 1 in the one or the other direction (depending on the rotational position). Better account can thus be taken of the circumstances of the assembly environment and the assembly of push-pull rod 2 is simplified.

Snap-action element 7 in turn comprises a plate 13 which rests on a plate-shaped section of lever arm 5. Snap-action element 7 also comprises a partial ring which, in the locked position, in contrast with the embodiment of FIG. 1a to 3d, is designed however for arrangement on body 4 of push-pull rod 2, in particular for encompassing sprocket 14 (see for example FIG. 11b).

Latching device 8 comprises a locking nose 10 which lies essentially opposite partial ring 9. Locking nose 10 essentially has the same width as partial ring 9 (in longitudinal extension direction X of lever arm 5, when snap-action element 7 is in the rotational position of FIG. 8a or FIG. 8b, i.e. when the locking nose runs in longitudinal extension direction X of lever arm 5).

FIGS. 11a, 11 b, 12a, 12b and 13 show a further embodiment of push-pull rod 2 with locking element 1 already described in connection with FIGS. 8a to 10b. Adapter 3 and body 4 of push-pull rod 2 are designed essentially the same as those of push-pull rod 2 described in connection with 4a to 7d. To avoid repetition, therefore, functionally identical parts are denoted by the same reference numbers and reference is made in this regard to the above description.

FIG. 11a shows locking element 1 before the introduction of pin 6 into eyelets 17 of adapter 3. FIG. 11b to 13 show locking element 1 in the assembled position.

Figure 13:
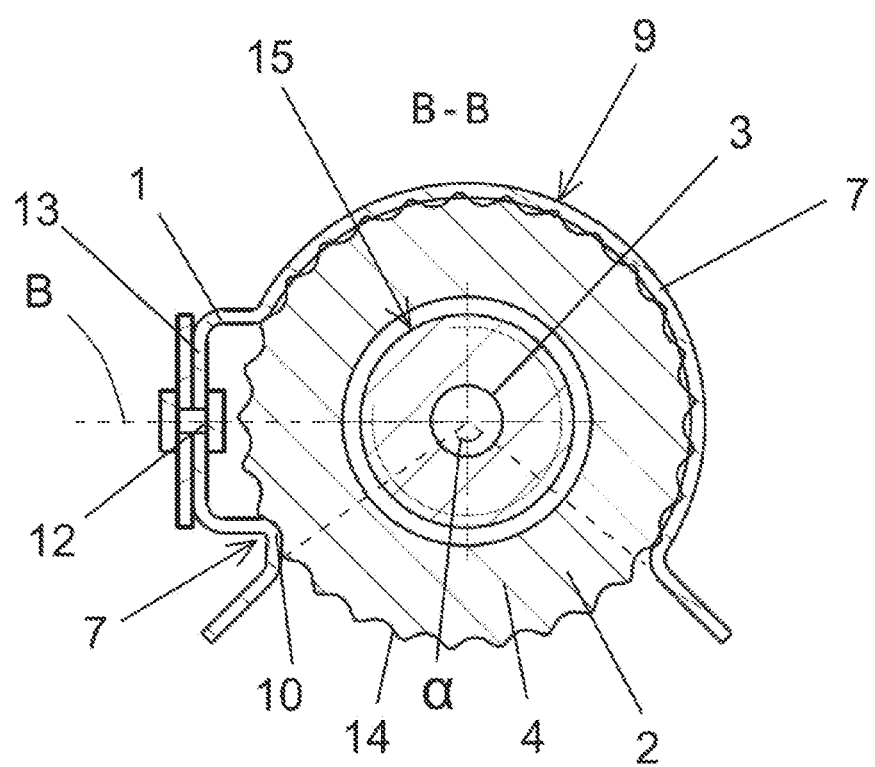
FIG. 13 the same push-pull rod as FIG. 11a in a cross-sectional view through plane B-B of FIG. 12b.
Figure 14A:
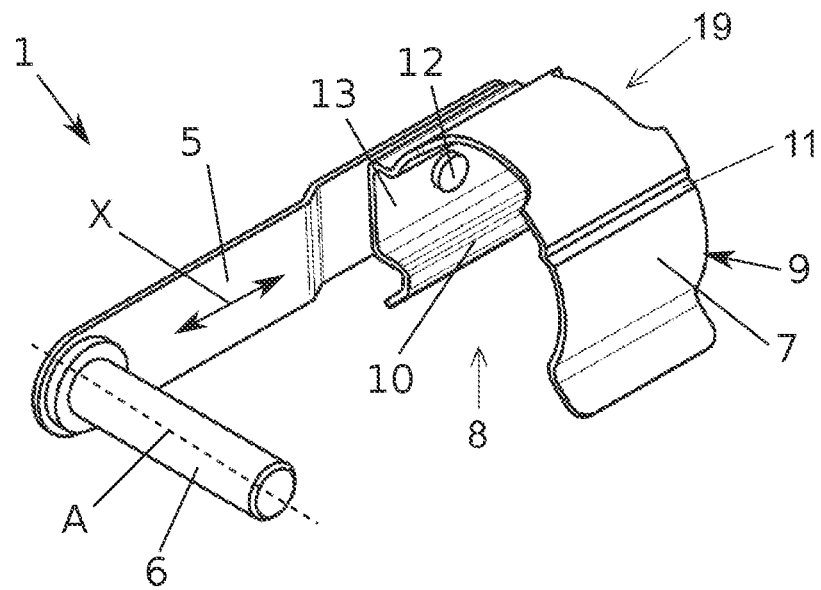
FIG. 14a a further embodiment of the locking element according to the disclosure in an oblique view from the front.
Figure 14B:
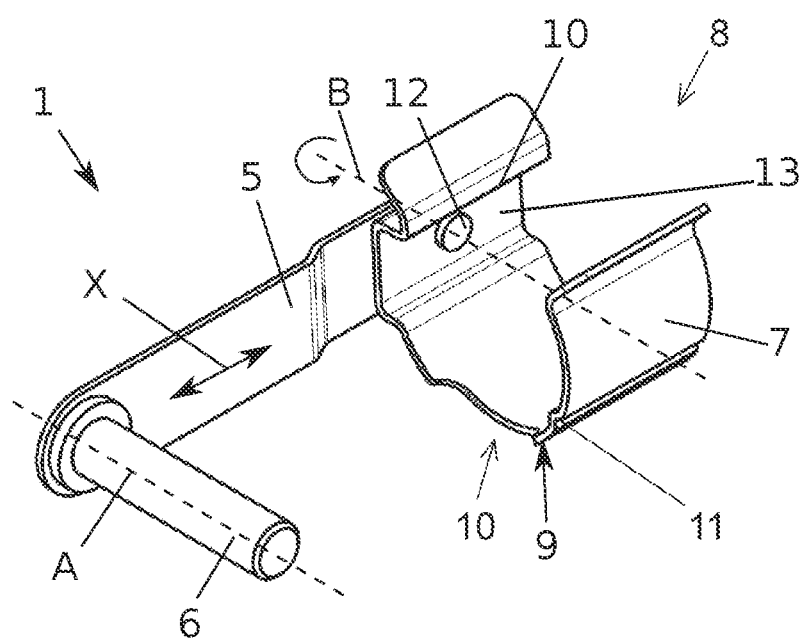
FIG. 14b the same locking element as FIG. 14a with a snap-action element rotated by 180°.
Figure 15A:
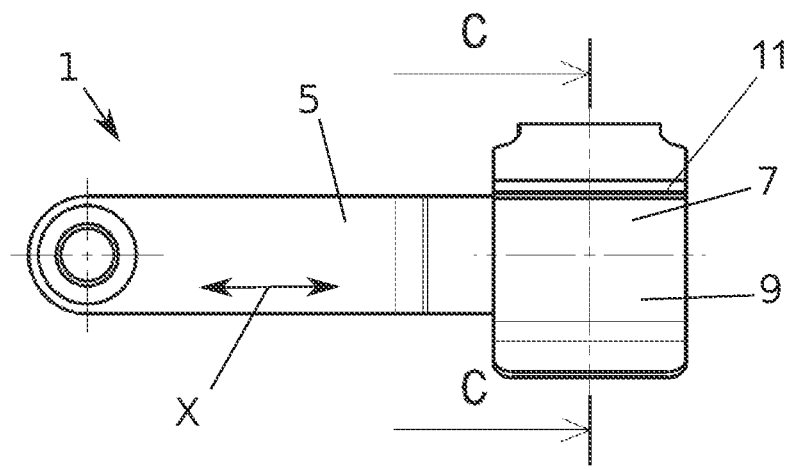
FIG. 15a the same locking element as FIG. 14a from the front.
Figure 15B:
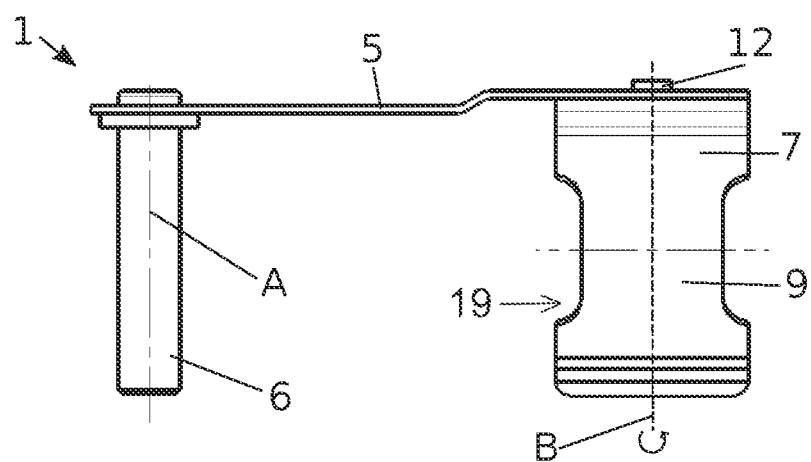
FIG. 15b the same locking element as FIG. 14a from the side.
Figure 16A:
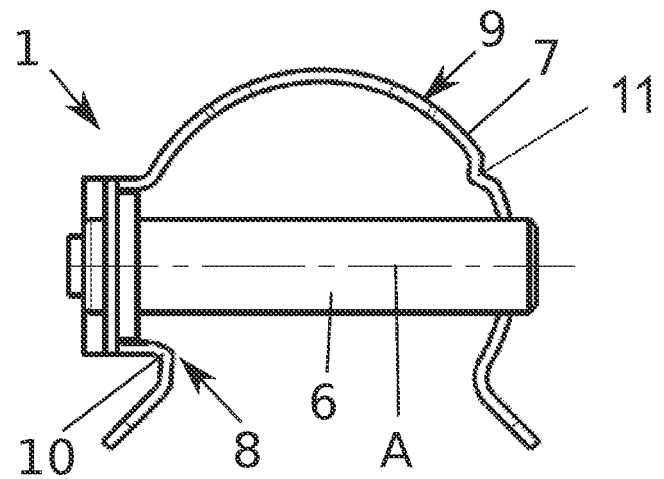
FIG. 16a the same locking element as FIG. 14a in a transverse view.
Figure 16B:
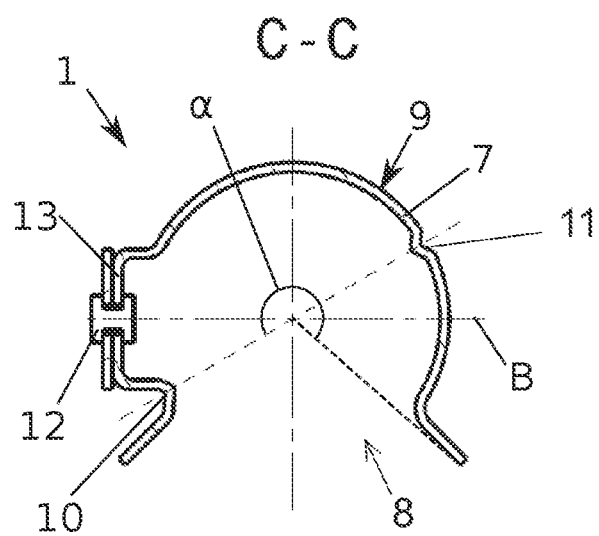
Figures 17A, 17B:
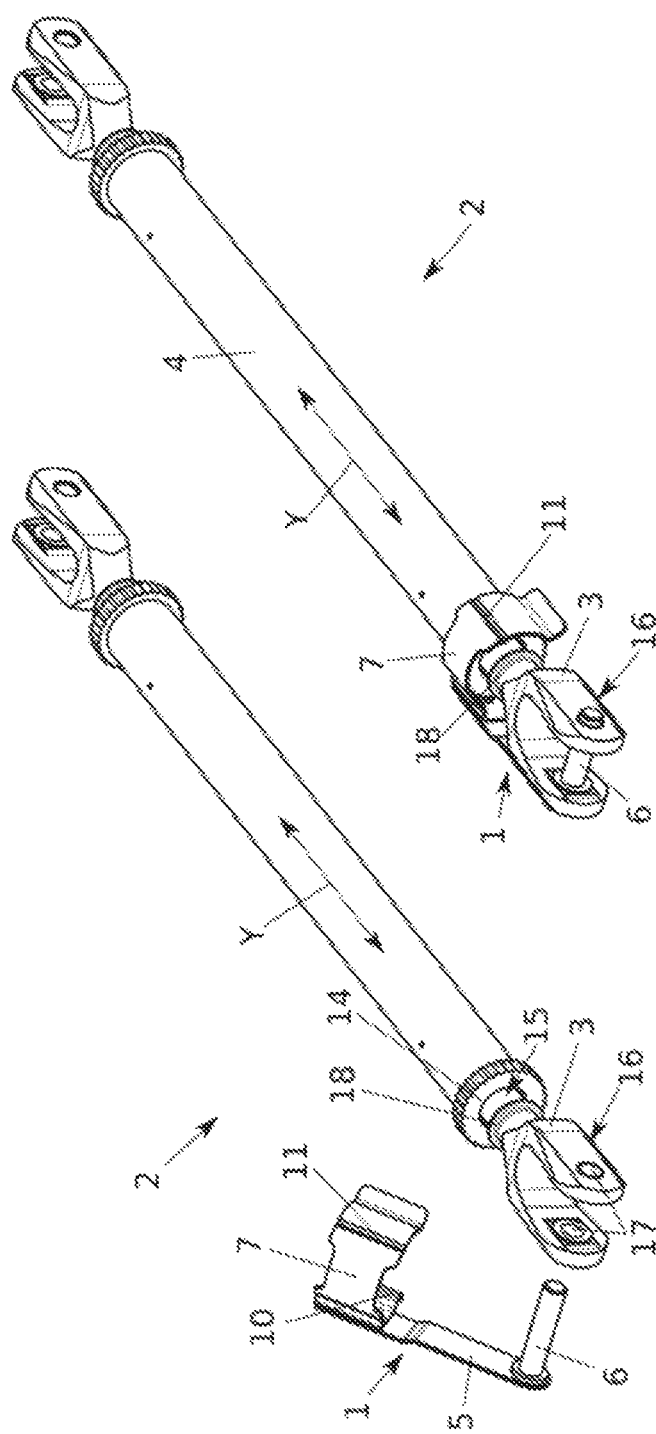
FIG. 17a a further embodiment of the push-pull rod according to the disclosure with the locking element of FIG. 14a before its assembly.
FIG. 17b the same push-pull rod as FIG. 17a with the locking element in the assembled state.

FIGS. 11a and 11b show push-pull rod 2 in an oblique view, FIG. 12a from the side, FIG. 12b in a cross-section along plane A-A in FIG. 12a, and FIG. 13 in a cross-section along plane B-B in FIG. 12b. As already mentioned in connection with FIGS. 8a to 10b, partial ring 9 of snap-action element 7 in the locked position is designed for arrangement on body 4 of push-pull rod 2. Partial ring 9 encompasses sprocket 14 on body 4 and thus presses locking nose 10 arranged roughly opposite partial ring 9 into sprocket 14. Locking nose 10 and partial ring 9 have a width in longitudinal extension direction Y of push-pull rod 2 (in the assembled position) which is greater than the length by which push-pull rod 2 can be adjusted by rotating adapter 3 relative to body 4, i.e. for example longer than cooperating threads of adapter 3 and body 4.

FIGS. 14a to 16b show a further embodiment of locking element 1. FIGS. 14a to 16b each show the same views of locking element 1 as corresponding FIGS. 8*a* to 10*b*. The embodiment shown in FIGS. 14*a* to 16*b* largely functions in the same way as the embodiment described above in connection with FIGS. 8*a* to 10*b*. To avoid repetition, therefore, functionally identical parts are denoted by the same reference numbers and reference is made in this regard to the above description.

Figure 19:
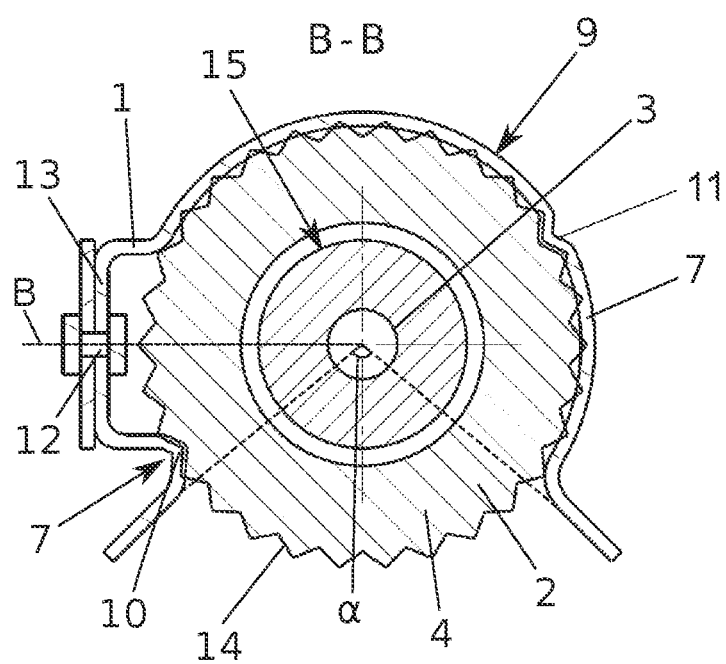
FIG. 19 the same push-pull rod as FIG. 17a in a cross-sectional view through plane B-B of FIG. 18b.

This embodiment differs from the embodiment shown in FIGS. 8*a* to 10*b* only in that latching device 8 comprises a second locking nose and that partial ring 9 has a narrowed region 19. Second locking nose 11 is provided on partial ring 9 and lies opposite first locking nose 10 relative to a centre point of push-pull rod 2 to be held (see FIGS. 16*b* and 19) and thus engages in the assembled state offset by essentially 180° into sprocket 14. The stability of the locking is thus improved. In narrowed region 19, partial ring 9 has a narrow point, i.e. a reduced width.

FIGS. 17*a* to 19 show a further embodiment of push-pull rod 2. FIGS. 17*a* to 19 each show the same views of locking element 1 as corresponding FIGS. 11*a* to 13. The embodiment shown in FIGS. 17*a* to 19 largely functions in the same way as the embodiment described above in connection with FIGS. 11*a* to 13. To avoid repetition, therefore, functionally identical parts are denoted by the same reference numbers and reference is made in this regard to the above description. The embodiment of FIGS. 17*a* to 19 differs from that of FIG. 11*a* to 13 only in that locking element 1 is designed according to the embodiment of FIGS. 14*a* to 16*b*.

FIG. 1-19 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A locking element releasably locking an end coupling adapter relative to a body of a push-pull rod, the locking element comprising a lever arm and a pin connected to the lever arm, a snap-action element and a latching element, the pin being inserted into eyelets of the end coupling adapter and the lever arm being rotated to parallel alignment with the push-pull rod such that the latching element engages the push-pull rod body for locking rotational movement of the end coupling adapter relative to the body, wherein the snap-action element is rotatably connected to the lever arm, wherein the snap-action element is rotatably connected to the lever arm about an axis of rotation parallel to the pin and snaps around the push-pull rod body or the end coupling adapter to retain the latching element in engagement with the body.

2. The locking element according to claim 1, wherein the snap-action element comprises a partial ring which is designed for arrangement on the adapter and/or the body of the push-pull rod in a locked position.

3. The locking element according to claim 1, wherein the snap-action element is rotatably connected to the lever arm in such a way that the snap-action element can assume at least a first rotational position and a second rotational position, wherein a snap opening of the snap-action element in the first rotational position points at least in a direction normal to a longitudinal extension of the pin and normal to a longitudinal extension of the lever arm and the second rotational position is orientated rotated by 180° to the first rotational position.

4. The locking element according to claim 1, wherein the latching element is spaced apart from the snap-action element in a longitudinal extension direction of the lever arm.

5. The locking element according to claim 1, wherein the snap-action element and latching element together encompass an angle range of more than 180°, relative to the push-pull rod to be embraced.

6. The locking element according to claim 1, wherein the latching element comprises a locking nose.

7. The locking element according to claim 1, wherein the latching element comprises two locking noses.

8. The locking element according to claim 1, wherein the snap-action element is connected to the lever arm by a swivel joint.

9. The locking element according to claim 1, wherein the snap-action element comprises a plate, which rests on the lever arm.

10. A push-pull rod with an end coupling adapter and a body, comprising a locking element releasably locking the adapter relative to the body of the push-pull rod, the locking element comprising a lever arm and a pin connected to the lever arm, a snap-action element and a latching element, the pin being inserted into eyelets of the end coupling adapter and the lever arm being rotated to parallel alignment with the push-pull rod such that the latching element engages the push-pull rod body for locking rotational movement of the end coupling adapter relative to the body, wherein the snap-action element is rotatably connected to the lever arm, wherein the snap-action element is rotatably connected to the lever arm about an axis of rotation parallel to the pin and snaps around the push-pull rod body or the end coupling adapter to retain the latching element in engagement with the body.

11. The push-pull rod according to claim 10, wherein in a preparatory position the snap-action element can be rotated about an axis of rotation, which is normal to longitudinal extension direction of the push-pull rod in an assembled state of the locking element.

12. The push-pull rod according to claim 10, wherein the body comprises a sprocket, into which at least one locking nose of the latching element is designed to be engageable.

13. The push-pull rod according to claim 12, wherein the latching element is designed longer in a longitudinal extension direction of the push-pull rod than a width of the sprocket.

14. The push-pull rod according to claim 10, wherein the snap-action element in an assembled state of the locking element partially encompasses the adapter.

15. The push-pull rod according to claim 10, wherein the adapter comprises a cylindrical lateral surface, a longitudinal extension of which in a longitudinal extension direction of the push-pull rod corresponds at least to a longitudinal extension of the snap-action element.

16. The push-pull rod according to claim 10, wherein the snap-action element is made of spring steel.

* * * * *